Reissued Dec. 14, 1948 Re. 23,060

UNITED STATES PATENT OFFICE 23,060

ORGANO-SILICON POLYMERS AND METHODS OF MAKING THEM

Rob Roy McGregor, Verona, and Earl Leathen Warrick, Pittsburgh, Pa., assignors to Corning Glass Works, Corning, N. Y., a corporation of New York No Drawing. Original No. 2,375,998, dated May 15, 1945, Serial No. 397,468, June 10, 1941. Application for reissue September 18, 1948, Serial No. 50,013

12 Claims. (Cl. 260—46.5)

This invention relates to plastics, lacquers, and the like, resulting from the polymerization of organo-silicon compounds.

The prior art shows that the development of organic lacquers and plastics has provided useful material for paints and coatings, and for solid objects of many descriptions. Due to the predominant organic nature of these materials, they are not stable indefinitely at temperatures above 200° C. A plastic capable of withstanding higher temperatures without decomposition is highly desirable.

The polymerization products of the mono-substituted silicane triols, which have never been isolated per se, probably would provide useful materials if their polymerization could be controlled. The silicane triols in which the substituted radicle is relatively small would be of particular interest because of their high inorganic content. A silicane triol containing the methyl radicle, $CH_3Si(OH)_3$, could theoretically yield a polymer containing silicon equivalent to nearly 90% $SiO_2$. Prior attempts to utilize such compounds have failed because, although the silicane triols condense more or less readily by splitting off water, it has not been possible to control the reaction and the product ultimately becomes non-workable and useless. If the substituted radicle is relatively large, condensation is slow and considerable time of heating is required during which oxidation may occur. As the size of the substituted radicle is decreased, condensation proceeds more readily and at the same time the oxidation resistance is improved. The methyl compound, for example, polymerizes so readily by condensation that the triol has never been isolated and it is only with great difficulty that complete oxidation can be brought about. It has been impossible heretofore to obtain the condensed product as a heat convertible solid because by the time the solvent has been removed it has set to an insoluble, infusible mass which cannot thereafter be worked and which cracks when heated.

The primary object of this invention is to produce lacquers and plastics which are capable of withstanding relatively high temperatures without decomposition.

Another object is to completely hydrolyze monosubstituted organo silicon compounds without loss of heat convertibility and solubility in organic solvents.

Still another object is to control the polymerization of such hydrolyzed compounds.

A further object it to polymerize and at the same time mold them under pressure.

Another object is to produce a soluble plastic containing condensed methyl silicane triol.

Another object is to produce a pressure-molding powder containing condensed methyl silicane triol.

Another object is to produce a pressure-molding powder containing condensed phenyl silicane triol.

To these and other ends the invention comprises the methods and the products to be hereinafter more fully described and claimed.

We have discovered a method by which the condensation of silicane triols may be controlled to yield a concentrated thermoplastic heat convertible product free from solvent, in which state the product can be employed in compositions for lacquers and coatings, or can be cast to shape and in some instances used in the production of molding powders.

In practicing the invention a hydrocarbon radicle of the class methyl, ethyl, propyl and phenyl is substituted in the usual manner by means of a Grignard synthesis in a hydrolyzable silicon compound such as a silicon ester (ethyl orthosilicate) or a silicon halide (silicon tetrachloride). The product, for example, monomethyl triethoxy silicane, $CH_3Si(OC_2H_5)_3$, is purified by fractional distillation and is then hydrolyzed by water. For this purpose the water is preferably mixed with alcohol, since the presence of a water miscible solvent is desirable in order to keep the mixture in solution. Sufficient water is used for complete hydrolysis, at least 1½ mols of water per mole of the silicon compound, and in the case of the ester, an acid catalyst such as dilute hydrochloric acid or oxalic acid is preferably included. Hydrolysis of the ester following complete admixture with the water proceeds with coincident condensation at room temperature and in about 48 hours has reached a stage where subsequent treatments yield the most desirable product.

Hydrolysis of the trihalide compound, for example, monomethyl silicon trichloride, requires special consideration with regard to the order of mixing the reactants. If the water or water-alcohol solution is added to the halide compound or its solution, vigorous hydrolysis occurs with theoretical substitution of halogen by hydroxyl to form the silicane triol, but the latter is simultaneously completely dehydrated or condensed and the resulting product is substantially polymerized to an infusible insoluble mass which is unworkable. On the other hand, if the halide compound or its solution is added to the water or the water-alcohol solution, the reaction proceeds in a controllable manner and, as in the case of the triethoxy compound, the condensation can be restrained to yield the desired product. Since the reaction in the case of the trihalide compound is more rapid than with the triethoxy compound less time will be required to obtain the desired product and it is preferable to prevent any substantial increase in temperature during the reaction by suitably cooling the reactants.

The solution containing the hydrolyzed and partially condensed product is poured into about two volumes of water for the purpose of washing the product and the mixture is stirred for about 15 minutes. The catalyst, which if allowed to remain would promote complete condensation during the subsequent treatment, is taken into solution and removed by the water. At the completion of the washing, the mixture is allowed to settle for about half an hour, or for a time sufficient for the desired product to separate out at the bottom as a viscous and sticky liquid. The water is decanted, the product is taken up in a solvent such as acetone or benzene, and the solution is dried preferably by treatment with a dehydrating agent such as anhydrous sodium sulphate to remove residual water. Vacuum treatment may also be employed but requires an excessive amount of time. Other dehydrating agents may be employed, but only those are suitable which are insoluble in the solvent used and which will extract free water without causing further condensation of the product. The use of such a dehydrating agent at this point is a useful feature of the method, because without its use great care must be used later to remove this excess water at low temperature.

After separation of the sodium sulphate by decantation or filtration, the solvent is removed under reduced pressure with an air stream flowing through the vessel, but not necessarily through the liquid. The temperature is raised gradually until evolution of gas from the liquid practically ceases and a sample of the liquid, when cooled to room temperature, is brittle and non-tacky. The temperature necessary to reach this state will vary directly with the pressure and should not be above about 150° C. If the pressure is not sufficiently reduced, the material will set up at a lower temperature to a partially insoluble and infusible mass. For the monomethyl compound a pressure of about 100 mm. of mercury is suitable. When the resin meets the above requirements, it is thermoplastic and heat convertible and may then be poured out and allowed to solidify. In the case of the monophenyl compound, solidification requires longer treatment but may be hastened by additionally heating for a short time at about 175° C. under atmospheric pressure.

Monosubstituted compounds in which the substituted radicle is ethyl, propyl or phenyl, when treated by the above described process, yield products having characteristics similar to the monomethyl product. The ethyl and propyl compounds oxidize more readily than the methyl compound on heating.

The above described monosubstituted silicon resins probably do not have any double bonds between silicon and oxygen because no instance of such a double bond is known. Hence polymerization theoretically can proceed until all hydroxyl groups have condensed and the silicon atoms are joined by siloxane linkages. Such product would be infusible and unworkable. By our method we prevent the condensation of the total hydroxyl groups and obtain a product which is thermoplastic and which can be further polymerized by heat. Analysis shows that in general in their thermoplastic state the concentrated resins produced as above described possess on the average one hydroxyl group for each three silicon atoms. The general formula for our product therefore appears to be $[(RSiO)_3OOH]_x$, where R is a hydrocarbon radicle, methyl, ethyl, propyl or phenyl. This may be considered either as a cyclic structure,

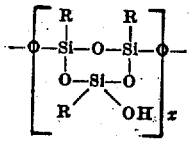

or as a chain structure,

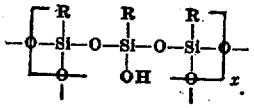

These compounds are partially dehydrated organo silicic acids which have one organic radicle attached to each silicon atom by a carbon-silicon linkage but which retain only one hydroxyl group for each three silicon atoms. Their physical properties indicate that they represent a stable and definite stage intermediate of the completely hydrated and the completely dehydrated monosilicane triols. They are analogous to the so-called B stage resins. For convenience they are hereinafter designated methyl-, ethyl-, propyl- or phenyl silicic anhydride. By analysis the silicon content of the methyl silicic anhydride is equivalent to about 85% $SiO_2$ and the carbon content is about 17%. The corresponding percentages for the ethyl silicic anhydride would be about 71% $SiO_2$ and 28% C. for the propyl silicic anhydride would be about 61% $SiO_2$ and 37% C., and for the phenyl silicic anhydride would be about 46% $SiO_2$ and 55% C.

The above described monosubstituted resins prepared in accordance with our process are in a concentrated form and may be adapted to a variety of uses. They may be dissolved in solvents and employed as lacquers for coating various materials. After evaporation of the solvent the coating may be further polymerized by heat and will become infusible and insoluble. The resins in their thermoplastic heat convertible state can be cast to form solid articles which are subsequently polymerized by heat.

They can also be adapted for molding under pressure with heat despite their sudden large viscosity change during final polymerization. Pressure molding with heat requires that the viscosity must first be increased sufficiently to allow the resins to accept pressure. The change from high viscosity to complete infusibility occurs quickly, and if the pressure is not applied at just the right moment, the resultant molding is powdery and incoherent. Furthermore, products of condensation which are continuously being formed during heating must be eliminated because trapped condensation products result in bubbles in the finished piece.

We have found that objectionable viscosity changes can be avoided by the proper admixture with anhydrous boric oxide and the mixture as a powder can be molded with heat and pressure without objectionable liquefaction and excessive evolution of gases. For this purpose the solid resin obtained by the controlled hydrolysis and condensation of the monosubstituted compound as described above is milled to a fine powder and is then mixed with a small amount, say about 3%, of powdered anhydrous boric oxide. The mixture is allowed to stand for about 48 hours, whereupon the powder becomes non-liquefiable and may be molded under pressure when heated to about 170° C. and results in a solid coherent mass free from bubbles and substantially transparent. The molded mass is not only infusible but is insoluble in the usual organic solvents. It contains the initially added boric oxide intimately and invisibly dispersed throughout. So far as is known, boric oxide is the only reagent which will produce this result. Other compounds, such as acetic anhydride, phthalic anhydride, phosphorus pentoxide and activated magnesium oxide, which it was expected would produce a similar result, were ineffective. These facts indicate that the boron is chemically combined. The mechanical strength and heat resistance of the molded mass may be improved by mixing a suitable filler with the molding powder. Any of the fillers commonly employed with plastics may be used except those having an alkaline reaction upon the molding powder, such as calcium carbonate and the like. For example, we have used asbestos, glass fibres and glass flakes with satisfactory results. The composite molded mass may contain as much as 75% of the filler.

Although the most desirable molding powder is produced from the monomethyl resin by the incorporation of boric oxide, the monoethyl, monopropyl and monophenyl silicon resins will also produce some of the benefits of our invention when so treated and are included within its scope. The molding powders and moldings thereof produced in accordance with this invention are characterized in that the resinous portion, whether it constitutes the total product or a part of a composite mixture, shows by analysis the presence of silicon, boron and an organic radicle which is methyl, ethyl, propyl or phenyl. The silicon expressed as $SiO_2$, the carbon content and the ratio of silica to carbon for the various compounds will amount as follows: The polymer of which the mer or structural unit contains the methyl radicle, $(CH_3SiO)_3OOH$, gives about 85% $SiO_2$, 17% C. and has a ratio $$\frac{SiO_2}{C}=5$$

The corresponding quantities for the polymer containing the ethyl radicle are about 71% $SiO_2$, 28% C. and $$\frac{SiO_2}{C}=2.5$$

for the propyl radicle about 61% $SiO_2$, 37% C. and $$\frac{SiO_2}{C}=1.66$$

and for the phenyl radicle about 46% $SiO_2$, 55% C. and $$\frac{SiO_2}{C}=.83$$

By means of our new method, mixtures of mono- and di-substituted compounds can be polymerized to advantage. For accomplishing this a disubstituted diethoxy silicane, for example, $(CH_3)_2Si(OC_2H_5)_2$, in an amount preferably not greater than about 27 mol% is mixed with a monosubstituted triethoxy silicane, for example, $CH_3Si(OC_2H_5)_3$, and the mixture is treated according to the above described process. The ethoxy silicanes containing one and two ethyl, propyl or phenyl radicles may be copolymerized in like manner. Mixtures in which the disubstituted silicane contains a different radicle than the monosubstituted silicane may also be polymerized. The product of such copolymerization possesses the advantage of greater flexibility after complete polymerization than the product obtained from the treatment of the monosubstituted compound alone. The characteristics of the copolymer resulting from such copolymerization are different than those of a mere mixture of the individually polymerized mono- and disubstituted compounds and a small proportion of the product consisting of structural units having one organic radicle per silicon atom remains dissolved in the water which was employed for precipitating and washing the product. Hence the amount of the structural units having one organic radicle per silicon atom is somewhat different than the amount which was contained in the initial mixture before polymerization. For example, when a mixture of 73 mol% of monomethyl triethoxy silicane and 27 mol% of dimethyl diethoxy silicane is polymerized, the resulting polymer contains about 69 mol% of the monomethyl structure unit instead of the 73 mol% which was present in the mixture before co-polymerization.

We claim:

1. A composition of matter which comprises a polymeric organo-silicon oxide having on the average less than two organic radicals per silicon atom, the organic substituents of said oxide being selected from the class consisting of alkyl radicals of 1 to 3 carbon atoms and phenyl radicals, and a minor proportion of boric oxide.

2. A molding powder which comprises a powdered thermosetting polymeric organo-silicon oxide having approximately one organic radical per silicon atom, the organic substituents of said oxide consisting essentially of methyl radicals attached to silicon through carbon-silicon linkages, and a minor proportion of boric oxide.

3. A molding powder which comprises a powdered thermosetting polymeric organo-silicon oxide having approximately one organic radical per silicon atom, the organic substituents of said oxide consisting essentially of ethyl radicals attached to silicon through carbon-silicon linkages, and a minor proportion of boric oxide.

4. A molding powder which comprises a powdered thermosetting polymeric organo-silicon oxide having approximately one organic radical per silicon atom, the organic substituents of said oxide consisting essentially of phenyl radicals attached to silicon through carbon-silicon linkages, and a minor proportion of boric oxide.

5. A composition of matter which comprises a polymeric organo-silicon oxide having approximately one organic radical per silicon atom, the organic substituents of said oxide being selected from the class consisting of alkyl radicals of 1 to 3 carbon atoms and phenyl radicals, and a minor-proportion of boric oxide.

6. A composition of matter which comprises a polymeric organo-silicon oxide having on the average less than two organic radicals per silicon atom, the organic substituents of said oxide consisting essentially of methyl radicals, and a minor proportion of boric oxide.

7. A composition of matter which comprises a polymeric organo-silicon oxide having on the average less than two organic radicals per silicon atom, the organic substituents of said oxide consisting essentially of ethyl radicals, and a minor proportion of boric oxide.

8. A composition of matter which comprises a polymeric organo-silicon oxide having on the average less than two organic radicals per silicon atom, the organic substituents of said oxide consisting essentially of phenyl radicals, and a minor proportion of boric oxide.

9. A molding powder which comprises a powdered thermosetting polymeric organo-silicon oxide having on the average less than two organic radicals per silicon atom, the organic substituents of said oxide being selected from the class consisting of alkyl radicals of 1 to 3 carbon atoms and phenyl radicals, and a minor proportion of boric oxide.

10. A molding powder which comprises a powdered thermosetting polymeric organo-silicon oxide having on the average less than two organic radicals per silicon atom, the organic substituents of said oxide consisting essentially of methyl radicals, and a minor proportion of boric oxide.

11. A molding powder which comprises a powdered thermosetting polymeric organo-silicon oxide having on the average less than two organic radicals per silicon atom, the organic substituents of said oxide consisting essentially of ethyl radicals, and a minor proportion of boric oxide.

12. A molding powder which comprises a powdered thermosetting polymeric organo-silicon oxide having on the average less than two organic radicals per silicon atom, the organic substituents of said oxide consisting essentially of phenyl radicals, and a minor proportion of boric oxide.

ROB ROY McGREGOR.
EARL LEATHEN WARRICK.

No references cited.